United States Patent [19]

Katakura et al.

[11] Patent Number: 5,517,374
[45] Date of Patent: May 14, 1996

[54] MAGNETIC DISK DRIVE APPARATUS HAVING DISK CLAMP ATTACHABLE USING A SINGLE FASTENER

[75] Inventors: Kouichi Katakura; Kunio Shimazu, both of Nagano, Japan

[73] Assignee: Kabushiki Kaisha Sankyo Seiki Seisakusho, Nagano, Japan

[21] Appl. No.: 225,792

[22] Filed: Apr. 11, 1994

[30] Foreign Application Priority Data

Apr. 9, 1993 [JP] Japan .................................. 5-107378

[51] Int. Cl.⁶ ..................................................... G11B 17/08
[52] U.S. Cl. ..................................... 360/28.07; 360/28.08; 360/22.08
[58] Field of Search ............................. 360/98.07, 99.04, 360/99.08, 99.12, 98.08; 369/269–271

[56] References Cited

U.S. PATENT DOCUMENTS 4,561,035 12/1985 McDorman ........................... 360/99.12
5,045,738 9/1991 Hishida ................................. 369/269

Primary Examiner—A. J. Heinz
Attorney, Agent, or Firm—Sughrue, Mion, Zinn, Macpeak & Seas

[57] ABSTRACT

A magnetic disk drive apparatus including: a hub being rotatably supported by bearings mounted on a center fixed shaft and driving magnetic disks while having the magnetic disks attached to the outer circumferential surface thereof; a drive magnet fixedly secured to the hub; and a stator core fixed on a frame portion so as to confront the drive magnet. A clamp cap portion on a distal end portion of the hub is arranged for closing a center hole of the hub, and a tap hole is formed at the center of the clamp cap portion so that a disk clamp for clamping the magnetic disks can be screwed.

4 Claims, 5 Drawing Sheets

MAGNETIC DISK DRIVE APPARATUS HAVING DISK CLAMP ATTACHABLE USING A SINGLE FASTENER

BACKGROUND OF THE INVENTION

1. Field of the Invention

The invention relates to a shaft fixed magnetic disk drive apparatus for rotating magnetic disks while having the magnetic disks attached thereto.

2. Related Art

A magnetic disk drive apparatus is designed to write and read data signals with respect to magnetic disks by attaching the magnetic disks to the outer circumferential surface of a rotatably supported hub and by rotating the hub to rotate the magnetic disks. Such magnetic disk drive apparatus can be classified into two types in terms of how the hub is rotatably supported: a shaft rotated type and a shaft fixed type. The shaft rotated type is characterized as rotatably supporting the shaft on the inner circumferential side of a bearing housing through bearings, and rotating the hub integrally with the shaft. The shaft fixed type is characterized as mounting bearings on the outer circumferential side of the fixed shaft, and rotatably supporting the hub by engaging the center hole of the hub with the outer circumferential side of the bearings. In either type, in order to give preloads to the bearings, a gap is provided between the inner ring of at least one bearing and the shaft before the preloads are given so that the inner ring of the bearing is slidable relative to the shaft.

According to the shaft rotated disk drive apparatus, the disk clamp for clamping the magnetic disks attached to the outer circumferential surface of the hub can be mounted by inserting only one screw into a tap hole formed at the center of the distal end portion of the rotating shaft, which is an advantage. However, since oscillations of the hub and hence oscillations of the magnetic disks are dependent on the gap between the inner ring of the bearing and the rotating shaft, if the oscillations of the magnetic disks are relatively large, it is difficult to control, e.g., oscillations in the axial direction to 25 μm or less. Further, in order to minimize the oscillations of the magnetic disks, lacing is provided on the outer circumferential surface of the hub with the magnetic disk drive apparatus already assembled. This entails a large number of assembling and metal working steps.

On the other hand, according to the shaft fixed magnetic disk drive apparatus, oscillations in both axial and radial directions of the hub and the magnetic disks are dependent on the gap between the outer ring of the bearing and the inner diameter of the hub. Since the hub is press-fitted into the outer ring of the bearing, there is no gap between the outer ring of the bearing and the inner diameter of the hub. Therefore, oscillations of the magnetic disks can be controlled within 5 μm without lacing the hub with the magnetic disk drive apparatus already assembled, thereby allowing the highly accurate magnetic disk drive apparatus to be obtained at a relatively low cost. A conventional shaft fixed magnetic disk drive apparatus will hereunder be described with reference to the drawings.

In FIGS. 9 and 10, a frame portion 10 has a center fixed shaft 12 so as to be integral therewith. The center fixed shaft 12 is cylindrical and extends upward from the central portion of the frame portion 10. On upper and lower portions of the outer circumference of the center fixed shaft 12 are inner rings 16, 22 of two ball bearings 14, 20. Between the inner ring 16 of the upper bearing 14 and the center fixed shaft 12 is a small gap so that the inner ring 16 is slidable relative to the center fixed shaft 12 until a preload is applied thereto. Outer rings 18, 24 of the respective bearings 14, 20 are press-fitted into a center hole 25 of a hub 26. The hub 26 has a jetty 82 on the inner circumferential edge of a distal end (the top end as viewed in FIGS. 9 and 10) thereof, the jetty 82 being circular as viewed in the axial direction. A cap 78 for closing the center hole 25 of the hub 26 is accommodated in the jetty 82. Axially extending tap holes 80 are provided at several positions (usually 4) on an outer circumferential side of the distal end portion of the hub 26, the outer circumferential side being further out of the jetty 82. A step 84 is formed at a lower portion of the hub 26 by increasing the outer diameter of the hub, and from the step 84 extends a circumferential wall 86 integrally therewith.

The inner rings 16, 22 and outer rings 18, 24 of the respective bearings 14, 20 contact the outer circumferential surface of the center fixed shaft 12 and the inner circumferential surface of the hub 26, respectively, under the condition that the inner rings 16, 22 of the respective bearings 14, 20 are given preloads in directions indicated by arrow (a) by biasing the inner ring 16 of the bearing 14 upward in the axial direction. This type of preload is called a static preload. Seals 51, 52 are arranged on both ends of each of the respective bearings 14, 20 so as to prevent splashes of a lubricant and the like from being scattered outside.

As shown in FIG. 10, an appropriate number of magnetic disks 40 (2 disks in the example shown in FIG. 10) are attached to the outer circumferential surface of the hub 26. More specifically, a magnetic disk 40, a spacer 42, and a magnetic disk 40 are set down along the outer circumferential surface of the hub 26 in this order, and these magnetic disks 40 and the spacer 42 are stopped by the step 84 of the hub 26. A disk clamp 90 made of a spring member is fitted on the outer side of the jetty 82 of the hub 26 and is mounted with setscrews 92 being screwed into the appropriate number of tap holes 80. The disk clamp 90 has a plurality of spring leg portions 91 extending radially from a ringlike base portion thereof. The respective magnetic disks 40 and the spacer 42 are fixedly secured to the hub 26 integrally with one another by these spring leg portions 91 biasing the upper magnetic disk 40 downward with resilient forces thereof.

A ringlike drive magnet 46 is fixedly secured to the inner circumferential surface of the circumferential wall 86 of the hub 26 through a yoke 88. The outer diameter of the frame portion 10 is set to a value larger than that of the center fixed shaft 12. A stator core 48 is secured to the outer circumferential side of the frame portion 10 by engagement. The stator core 48 has an appropriate number of salient poles in the radial direction thereof, each salient pole having a drive coil 50 wound. The outer circumferential surface of the stator core 48, i.e., the tip of each salient pole confronts the inner circumferential surface of the drive magnet 46 while interposing a predetermined gap.

When the drive coils 50 are energized alternately in accordance with the rotational position of the drive magnet 46, the drive magnet 46 as well as the hub 26 and the magnetic disks 40 integrated with the drive magnet 46 are rotated. Since the bearing 14 is exposed from the distal end portion of the hub 26 through the center hole 25 in the thus constructed shaft fixed magnetic disk drive apparatus, the cap 78 is used to cover the center hole 25 to prevent splashes of the lubricant and the like from adhering to the surfaces of the magnetic disks 40.

It is true that the shaft fixed magnetic disk drive apparatus can provide the advantage that oscillations of the hub 26 and the magnetic disks 40 can be minimized and that the highly accurate magnetic disk drive apparatus can be obtained at a relatively low cost as described above. However, in the shaft fixed magnetic disk drive apparatus, as shown in FIGS. 9 and 10, the disk clamp 90 must be screwed at a plurality of positions on the circumferential edge of the hub 26. This brings about variations in the depth of the tap holes 80, variations in the tightening torque of the screws 92, and the like, which then deteriorates the rotational balance between the hub 26 and the magnetic disks 40, thus causing, in some cases, precessions and oscillations during rotation.

SUMMARY OF THE INVENTION

The invention has been made to overcome these problems of the conventional shaft fixed magnetic disk drive apparatus. Accordingly, the object of the invention is to provide a magnetic disk drive apparatus in which the disk clamp can be secured with only one screw, so that rotational imbalance between the hub and the magnetic disks due to vibrations in the tightening torque of the disk clamp can be eliminated to get rid of precessions and oscillations during rotation.

To achieve the above object, there is provided a magnetic disk drive comprising a center fixed shaft; a bearing mounted on the center fixed shaft; a hub being rotatably supported by the bearing and driving a magnetic disk while having the magnetic disk attached to the outer circumferential surface thereof; a drive magnet fixedly secured to the hub; a stator core secured to a frame portion so as to confront the drive magnet; and a clamp cap member for closing a center hole of the hub is arranged on a distal end portion of the hub, the clamp cap member including a tap hole for screwing a disk clamp to clamp the magnetic disk, the tap hole being formed at the center of the clamp cap member.

The clamp cap portion on the distal end portion of the hub not only closes the center hole of the hub but also covers the center fixed shaft and the bearings mounted thereon with the hub being rotatably supported. The disk clamp can be mounted on the hub only by inserting the single screw into the tap hole formed at the center of the clamp cap portion, and the magnetic disks can be attached to the hub by biasing the magnetic disks fitted into the outer circumferential surface of the hub with the disk clamp.

DETAILED DESCRIPTION OF THE PREFERRED EMBODIMENTS

Figure 9:
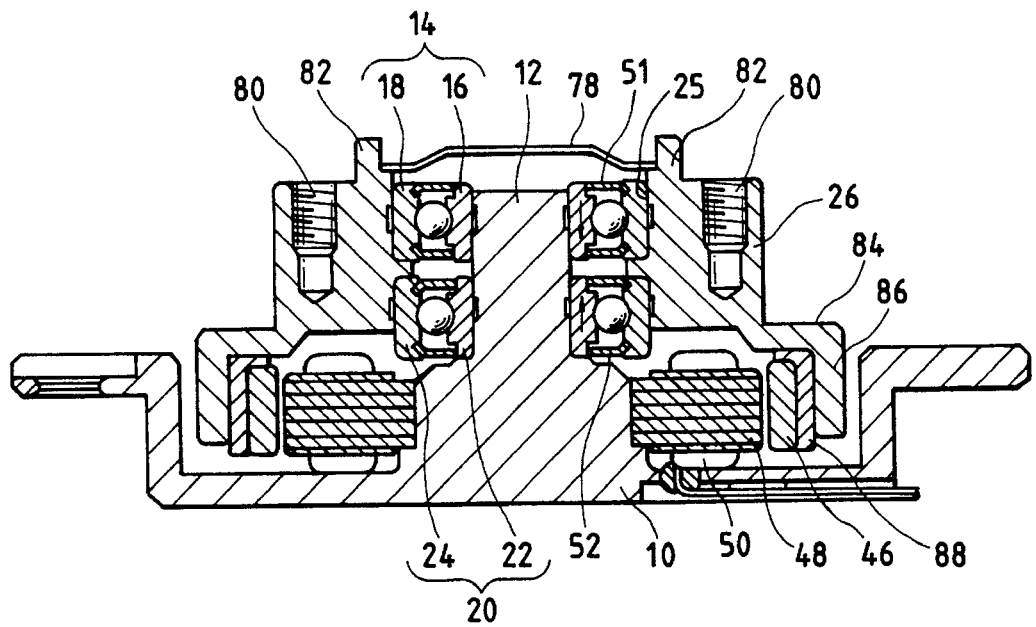
FIG. 9 is a sectional view showing an example of a conventional magnetic disk drive apparatus.
Figure 10:
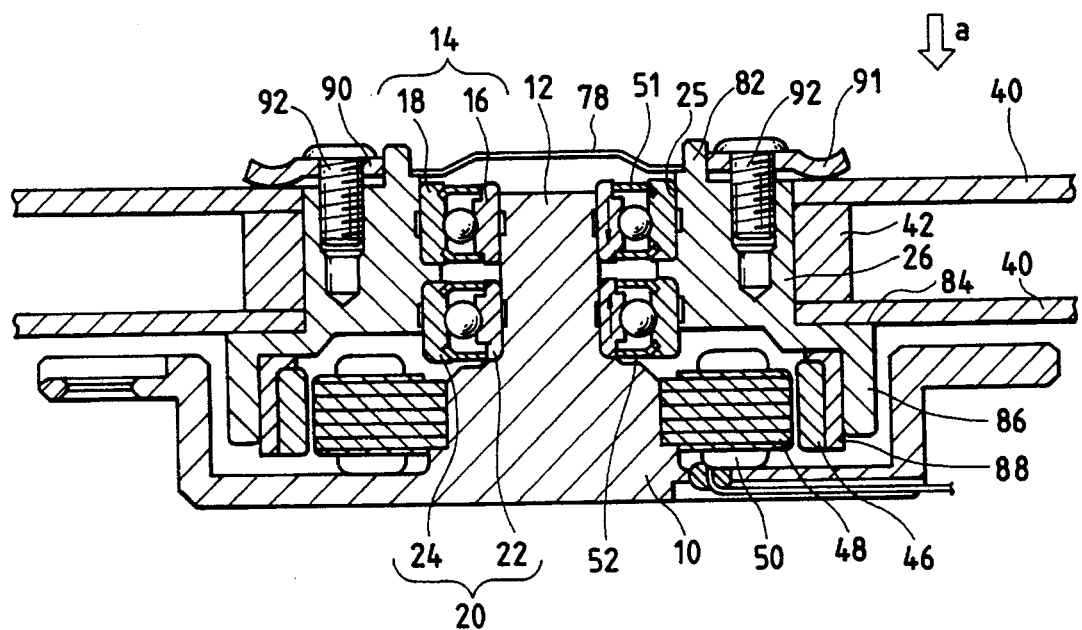
FIG. 10 is a sectional view showing the conventional magnetic disk drive with a disk clamp mounted thereon.

Magnetic disk drive apparatuses, which are embodiments of the invention, will now be described. Parts and components corresponding to those of the conventional example shown in FIGS. 9 and 10 are designated by the same reference numerals.

Figure 1:
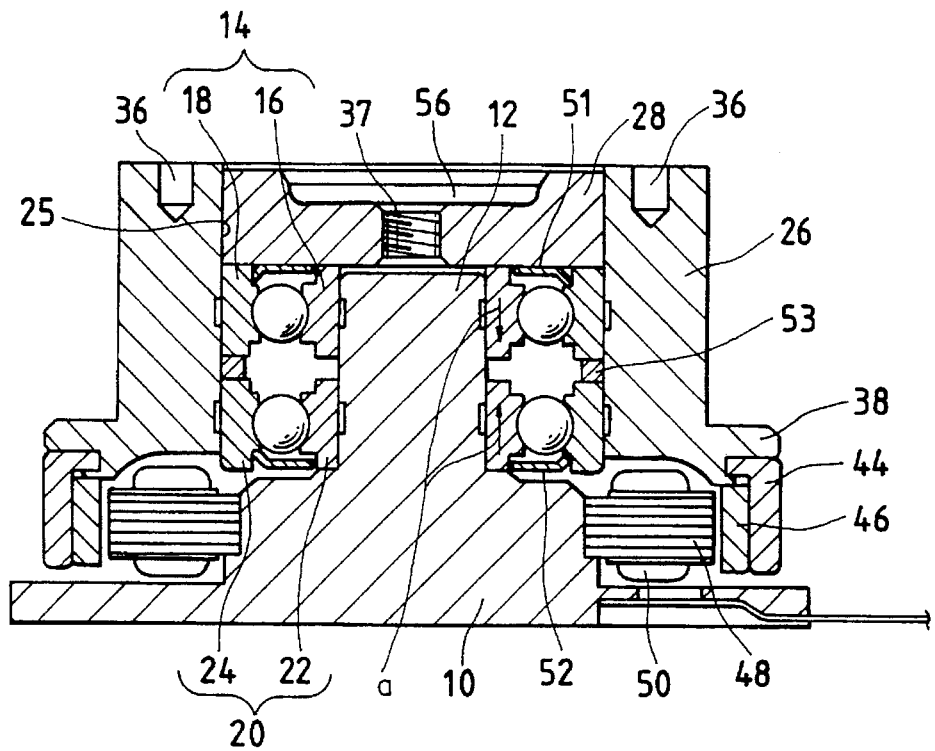
FIG. 1 is a sectional view showing a magnetic disk drive apparatus, which is an embodiment of the invention.

In FIG. 1, a frame portion 10 has a center fixed shaft 12 so as to be integral therewith. The center fixed shaft 12 is cylindrical and extends upward from a central portion of the frame portion 10. On upper and lower portions of the outer circumference of the center fixed shaft 12 are inner rings 16, 22 of two ball bearings 14, 20. Between the inner ring 16 of the upper bearing 14 and the center fixed shaft 12 is a small gap so that the inner ring 16 is slidable relative to the center fixed shaft 12. Outer rings 18, 24 of the respective bearings 14, 20 are press-fitted into a center hole 25 of a hub 26. A spacer 53 is interposed between these outer rings 18, 24. A distal end portion of the hub 26 (the top end portion as viewed in FIG. 1) is projected upward from the top end surfaces of the center fixed shaft 12 and the upper bearing 14. A clamp cap portion 28 is fixedly secured to the center hole 25 of the projected portion by press fitting or the like. A circular recessed portion 56 is formed on the top surface side of the clamp cap portion 28. A tap hole 37 whose diameter is smaller than that of the recessed portion 56 is formed at the center of the clamp cap portion 28 so as to pass therethrough vertically.

Axially extending holes 36 are formed at several positions on the distal end portion of the hub 26. In the figure showing the hub 26, an outwardly extending flange portion 38 is formed integrally on the lower portion of the hub 26, and a ringlike rotor yoke 44 is fixedly secured to the lower surface side of the flange portion 38. A ringlike drive magnet 46 is fixedly secured to the inner circumferential surface side of the rotor yoke 44. An appropriate number of magnetic poles are formed over the drive magnet 46 at a predetermined interval in the circumferential direction.

Static preloads are given by the inner rings 16, 22 and outer rings 18, 24 of the respective bearings 14, 20 contacting the outer circumferential surface of the center fixed shaft 12 and the inner circumferential surface of the hub 26, respectively, under the condition that the inner rings 16, 22 of the respective bearings 14, 20 are given preloads in directions indicated by arrow (a) by biasing the inner ring 16 of the bearing 14 downward in the axial direction. Thus, with the preloads imparted to the bearings 14, 20 in this way, a very small gap of, e.g., some 50 µm is provided between the top end surface of the inner ring 16 of the upper bearing 14 and the bottom end surface of the clamp cap portion 28. Seals 51, 52 are arranged on the top end portion of the bearing 14 and the bottom end portion of the bearing 20 so as to prevent splashes of a lubricant and the like from being scattered outside.

Figure 2:
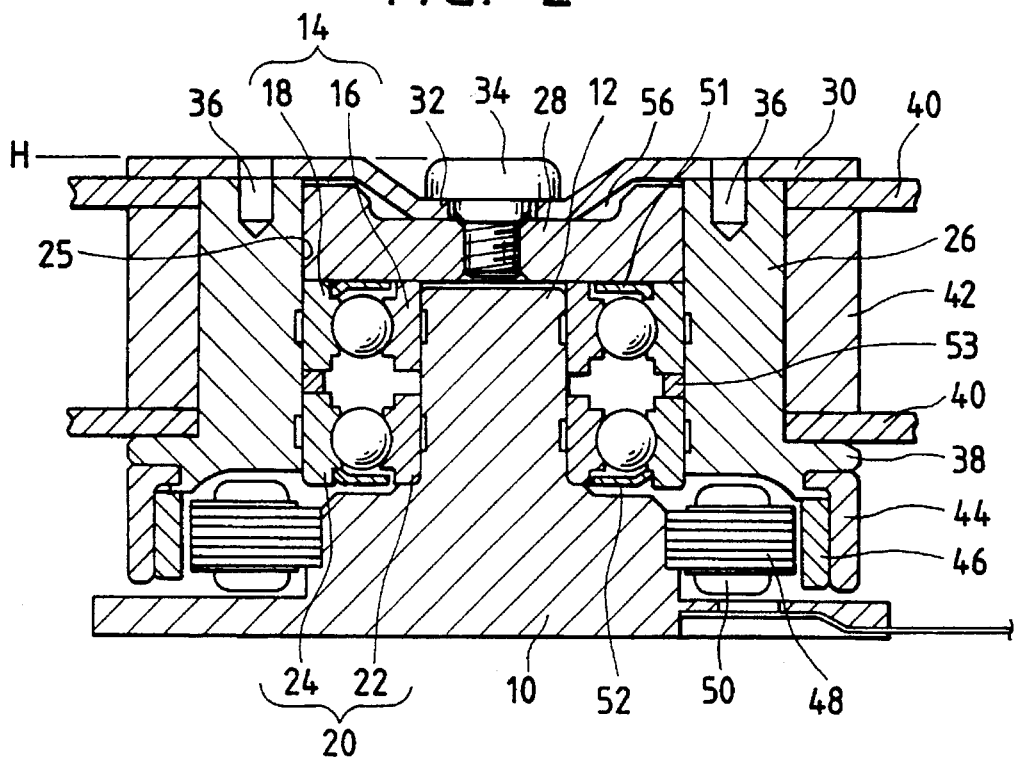
FIG. 2 is a sectional view showing the above embodiment with a disk clamp mounted thereon.

As shown in FIG. 2, an appropriate number of magnetic disks 40 (2 disks in the example shown in FIG. 2) are attached to the outer circumferential surface of the hub 26. More specifically, a magnetic disk 40, a spacer 42, and a magnetic disk 40 are set down along the outer circumference of the hub 26 in this order, and these magnetic disks 40 and the spacer 42 are stopped by a flange portion 38 of the hub 26. A disk clamp 30 made of a spring member is carried on the distal end (the top end as viewed in FIG. 2) of the hub 26. The disk clamp 30 is circular as viewed in the axial direction, and has an embossed portion 32 that is accommodated in the recessed portion 56 of the clamp cap portion 28 in a central portion thereof. A mounting hole is formed at the center of the embossed portion 32. A screw 34 is inserted into this mounting hole. The disk clamp 30 is mounted on the hub 26 by the screw 34 being screwed into the tap hole 37 of the clamp cap portion 28.

The outer circumference of the disk clamp 30 is projected from the outer circumference of the top end of the hub 26. The respective magnetic disks 40, 40 and the spacer 42 are attached integrally to the hub 26 by this projected portion biasing the upper magnetic disk 40 downward with a resilient force thereof. Each hole 36 arranged on the hub 26 serves to stop the rotation of the disk clamp 30 and the hub 26 at the time the screw 34 is inserted. That is, the screw 34 is fastened with rotation stop pins inserted into the holes 36 through the holes of the disk clamp 30. If the height of the top end surface of the disk clamp 30 is set to H, the depth of the recessed portion 56 of the clamp cap portion 28 is set so that the height of the top end surface of the screw 34 is equal to or greater than the height H.

The outer diameter of the frame portion 10 is set to a value larger than that of the center fixed shaft 12. A stator core 48 is secured to the outer circumferential side of the frame portion 10 by engagement. The stator core 48 has an appropriate number of salient poles in the radial direction thereof, each salient pole having a drive coil 50 wound. The outer circumferential surface of the stator core 48, i.e., the tip of each salient pole confronts the inner circumferential surface of the drive magnet 46 while interposing a predetermined gap.

When the drive coils 50 are energized alternately in accordance with the rotational position of the drive magnet 46, the drive magnet 46 as well as the hub 26 and the magnetic disks 40 integrated with the drive magnet 46 are rotated.

The thus described embodiment, which is the shaft fixed magnetic disk drive apparatus, is designed to include: the clamp cap portion 28 that closes the center hole 25 on the distal end portion of the hub 26 that drives the magnetic disks 40 while having the magnetic disks attached to the outer circumferential surface thereof; and the tap hole 37 serving to screw the disk clamp 30 at the center of the clamp cap portion 28. Therefore, even if the magnetic disk drive apparatus is of the shaft fixed type, the disk clamp 30 can be secured with only one screw, thereby contributing to eliminating precessions and vibrations during rotation due to rotational imbalance between the hub 26 and the magnetic disks 40 caused by variations in the tightening torque of the disk clamp 30. The clamp cap portion 28 closes the center hole 25 arranged on the distal end portion of the hub 26, thereby preventing splashes of the lubricant and the like from the bearings 14, 20 from adhering to the surfaces of the magnetic disks 40.

In the above embodiment, parts materials can be selected arbitrarily. For example, the frame portion 10 and the hub 26, both integrated with the center fixed shaft 12, may be made of aluminum because aluminum is easy to work; and the clamp cap portion 28 may be made of steel so that the disk clamp 30 can be mounted surely as well as rigidly even if the tap hole 37 is shallow. All these members may, however, be made of aluminum, steel, or other materials.

Figure 3:
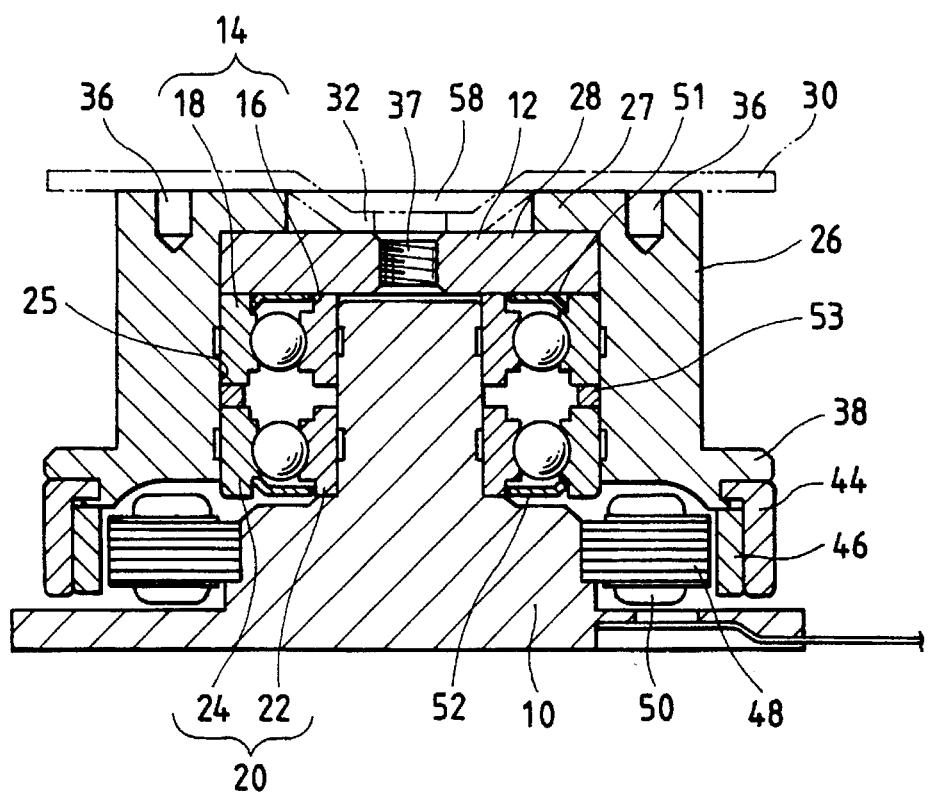
FIG. 3 is a sectional view showing a magnetic disk drive apparatus, which is another embodiment of the invention.

Modifications of the above embodiment will now be described. An embodiment shown in FIG. 3 has modified the structure in which the clamp cap portion 28 is secured to the hub 26. That is, an inwardly facing flange portion 27 is arranged on the distal end portion of the hub 26 so as to be integral therewith; the clamp cap portion 28 fitted into the center hole 25 of the hub 26 from bottom is secured to the hub 26 with the clamp cap portion 28 being abutted against the ceiling surface of the flange portion 27. Since a recessed portion 58 is formed by the inner circumferential surface of the flange portion 27 and the top surface of the clamp cap portion 28, the disk clamp 30 is mounted by dropping the embossed portion 32 of the disk clamp 30 into the recessed portion 58 and then inserting a setscrew into the tap hole 37 of the clamp cap portion 28. Since other constructional and operational aspects are the same as those of the above-mentioned embodiment, the descriptions thereof will be omitted.

Figure 4:
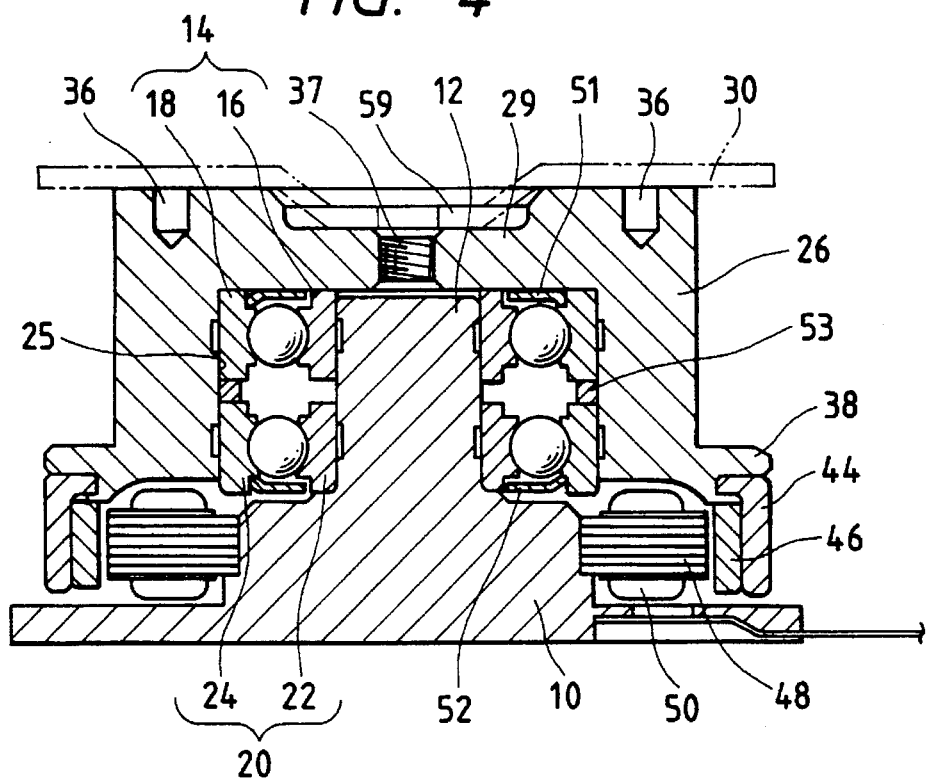
FIG. 4 is a sectional view showing a magnetic disk drive apparatus, which is another embodiment of the invention.

While the thus far described embodiments are of such a type that the clamp cap portion is formed into a body separate from the hub and that the clamp cap portion is secured to the hub by engagement, a clamp cap portion 29 may be formed so as to be integral with the distal end portion of the hub 26 as an embodiment shown in FIG. 4. In a manner similar to the embodiments shown in FIGS. 1 and 2, a circular recessed portion 59 is formed on the top surface side of the clamp cap portion 29, and the tap hole 37 whose diameter is smaller than that of the recessed portion 59 is formed at the center of the clamp cap portion 29 so as to pass therethrough vertically. Since other constructional and operational aspects including how the disk clamp 30 is mounted are similar to those of the first embodiment, the descriptions thereof will be omitted.

Figure 5:
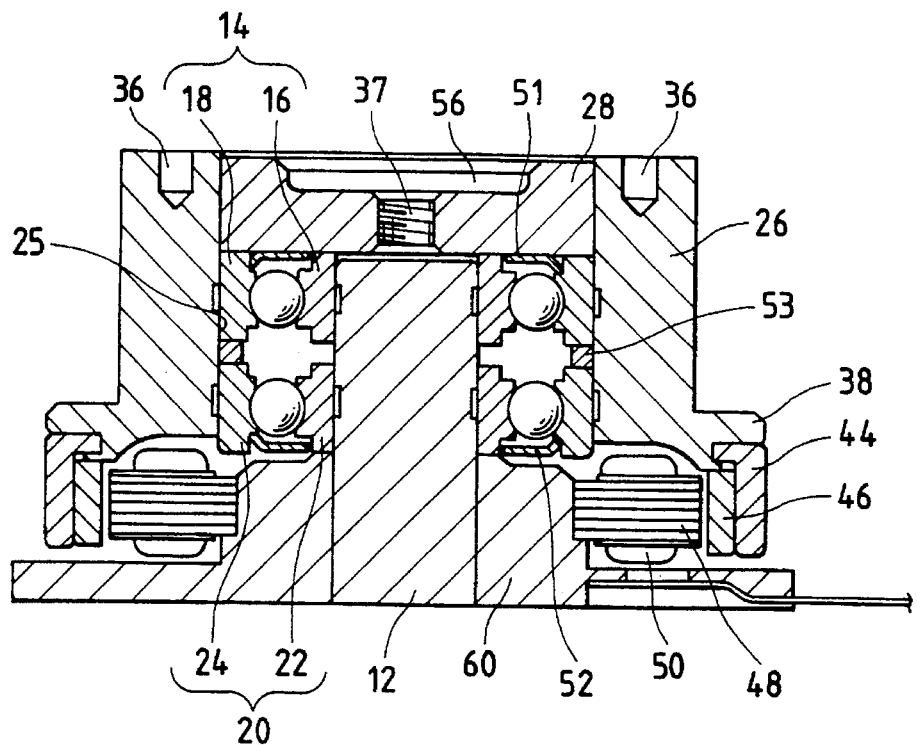
FIG. 5 is a sectional view showing a magnetic disk drive apparatus, which is another embodiment of the invention.

While the center fixed shaft and the frame are formed integrally with each other in the thus far described embodiments, the center fixed shaft 12 and a frame 60 may be formed into separate bodies and the center fixed shaft 12 may be secured to the frame 60 while press-fitted into a center hole formed on the frame 60 as shown in FIG. 5. In the embodiment shown in FIG. 5, the final profile thereof into which the center fixed shaft 12 and the frame 60 are assembled is the same as that of the center fixed shaft and the frame in the embodiments shown in FIGS. 1 and 2. Other constructional and operational aspects of this embodiment are the same as those of the embodiments shown in FIGS. 1 and 2.

Figure 6:
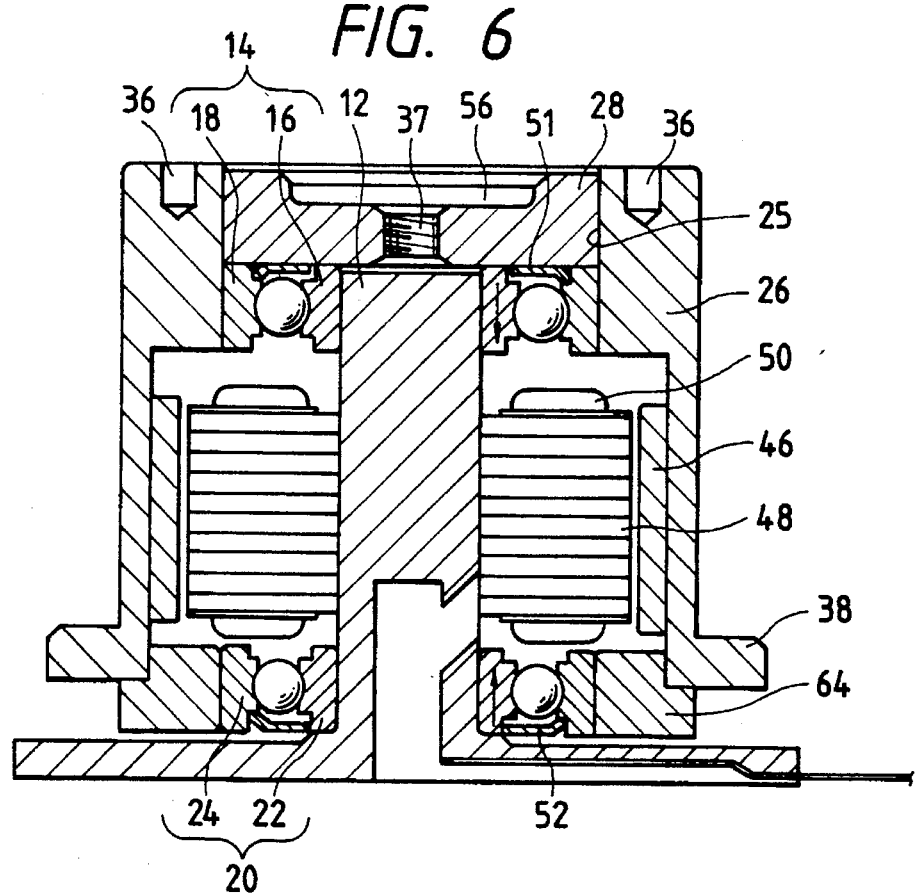
FIG. 6 is a sectional view showing a magnetic disk drive apparatus, which is another embodiment of the invention.

While the two bearings 14, 20 are arranged at the position adjacent to the distal end portion of the center fixed shaft 12 so that the hub 26 is supported at one end, or in cantilevered form, the hub 26 may be supported by the two bearings 14, 20 at two ends as an embodiment shown in FIG. 6. In FIG. 6, the center fixed shaft 12 is formed so as to be relatively long in the axial direction, and the inner rings 16, 22 of the bearings 14, 20 are mounted on both top and bottom end portions of the center fixed shaft 12. The stator core 48 is secured to an intermediate portion between these bearings 14, 20 on the center fixed shaft 12. That is, the center fixed shaft 12 serves also as the frame. The outer ring 18 of the upper bearing 14 is fitted into the center hole 25 on the top end side of the hub 26, whereas the outer ring 24 of the lower bearing 20 is fitted into the inner circumference of an intermediate ring 64 that is fitted into the inner circumferential edge portion on the bottom end side of the hub 26. Both end portions of the hub 26 are rotatably supported by the bearings 14, 20 in this way. The stator core 48 is designed so as to be relatively long in the axial direction, and so are the axial dimensions of the hub 26 and the drive magnet 46 so as to match the stator core. Other constructional aspects are the same as those of the embodiments shown in FIGS. 1 and 2. According to this embodiment, the hub 26 is supported by the two bearings 14, 20 at two ends. Therefore, the oscillations of the hub 26 and the magnetic disks attached to the hub can be reduced further.

Figure 7:
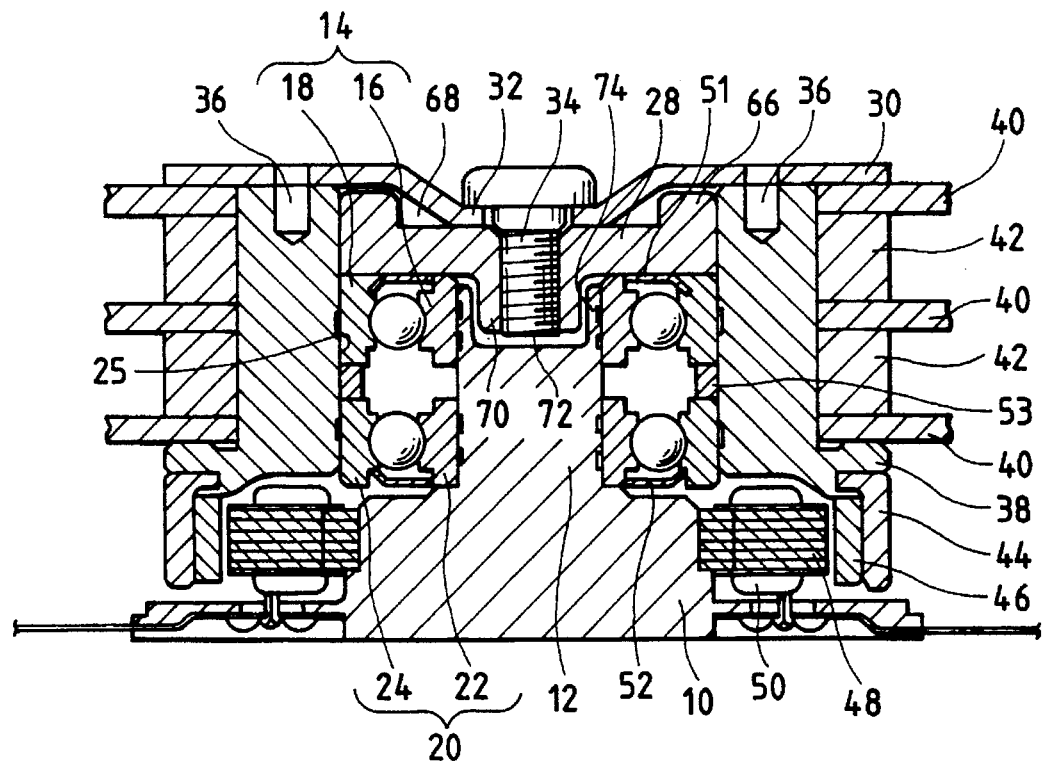
FIG. 7 is a sectional view showing a magnetic disk drive apparatus, which is another embodiment of the invention.

In order to screw the disk clamp to the clamp cap portion surely as well as rigidly, it is desirable to increase the axial length of the tap hole formed at the center of the clamp cap portion. FIG. 7 shows an example in which the tap hole length is increased by modifying the profiles of the clamp cap portion and the center fixed shaft. In FIG. 7, the clamp cap portion 28 fitted into the center hole 25 arranged on the distal end portion of the hub 26 while closing the center hole 25 has a boss 70 that is projected from the bottom surface, and a tap hole that is long in the axial direction is formed so as to pass through the boss 70 vertically. The disk clamp 30 is attached with the setscrew 34 inserted into the tap hole. The setscrew 34 has substantially the same length as that of the tap hole in the axial direction, and is screwed into the tap hole strongly. A jetty 66 is formed on the top surface of the outer circumferential edge portion of the clamp cap portion 28, and the embossed portion 32 of the disk clamp 30 is accommodated in a recessed portion 68 enclosed by the jetty 66 to screw the disk clamp 30 as described above. A recessed portion 72 is formed on the distal end portion of the center fixed shaft 12 confronting the boss 70 of the clamp cap portion 28, leaving a circular jetty 74. The boss 70 is fitted into the recessed portion 72 while leaving some space therebetween. Other constructional aspects of this embodiment are the same as those of the embodiments shown in FIGS. 1 and 2.

Figure 8:
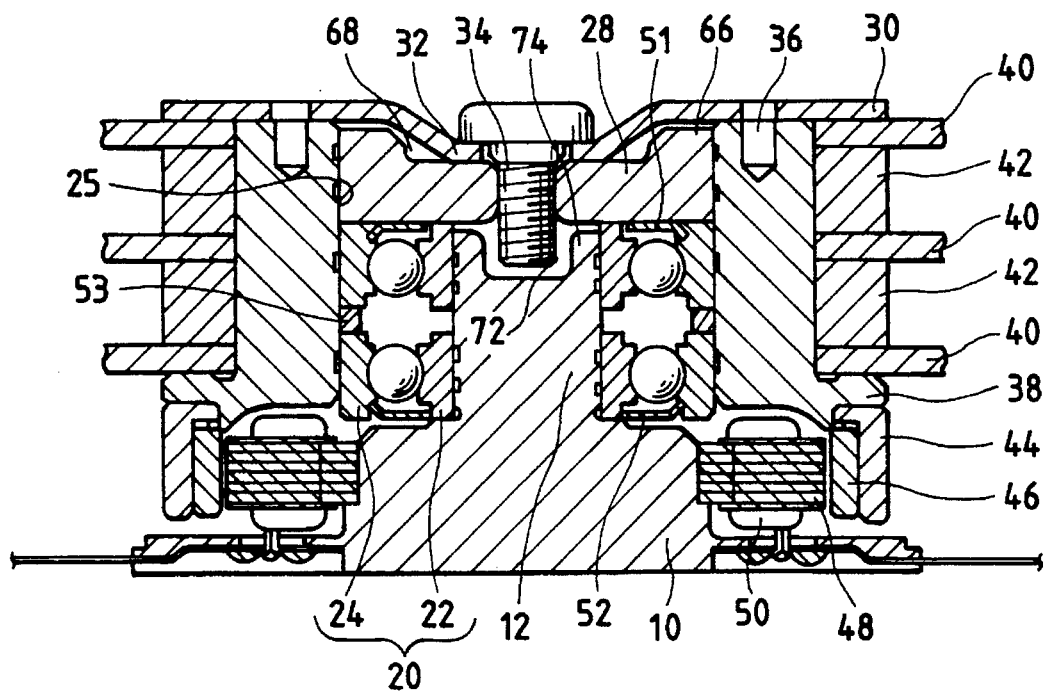
FIG. 8 is a sectional view showing a magnetic disk drive apparatus, which is another embodiment of the invention.

The embodiment shown in FIG. 7 may be modified into one shown in FIG. 8. That is, the embodiment shown in FIG. 8 is such that the boss 70 of the clamp cap portion 28 in the embodiment shown in FIG. 7 is omitted, and that the axial dimension of the screw 34 for screwing the disk clamp 30 is set to such an adequately large value as to pass through the clamp cap portion 28, so that the screw 34 is projected from the bottom end surface of the clamp cap portion 28. In addition, the recessed portion 72 for giving a play to the screw 34 and the jetty 74 enclosing such recessed portion are arranged on the distal end portion of the center fixed shaft 12. According to the embodiment shown in FIG. 8, the screw 34 can be inserted by effectively utilizing the entire part of the tap hole of the clamp cap portion 28. As a result, the disk clamp 30 can be mounted surely as well as rigidly.

The number of bearings for rotatably supporting the hub relative to the center fixed shaft is selected arbitrarily. The number may be either two as in the shown embodiments, or one. The bearing type is not limited to the ball bearing; metal bearings, dynamic pressure bearings, and the like may be used. The tap hole formed at the center of the clamp cap portion is not necessarily a hole that passes through the clamp cap portion, but may be a baglike tap hole.

The shaft fixed magnetic disk drive apparatus of the invention is characterized as arranging a clamp cap portion for closing a center hole on a distal end portion of a hub that is driven with magnetic disks attached to the outer circumferential surface thereof; and forming a tap hole for screwing a disk clamp at the center of the clamp cap portion. Therefore, even if the magnetic disk drive apparatus is of the shaft fixed type, the magnetic disk drive apparatus of the invention can firmly secure the disk clamp with only one screw, thereby preventing precessions and oscillations during rotation by eliminating the rotational imbalance between the hub and the magnetic disks caused by variations in the tightening torque of the disk clamp. In addition, since the disk clamp can be fixed with a single screw, the parts cost and the assembling cost can be reduced.

What is claimed is:

1. A magnetic disk drive comprising:

a center fixed shaft;

a bearing mounted on the center fixed shaft, said bearing including an inner ring contacting the center fixed shaft, and an outer ring, said bearing being given a preload axially along the center fixed shaft;

a hub being rotatably supported by the bearing and driving a magnetic disk while having the magnetic disk attached to the outer circumferential surface thereof;

a drive magnet fixedly secured to the hub;

a stator core secured to a frame portion so as to confront the drive magnet; and a clamp cap member for closing a center hole of the hub is arranged on a distal end portion of the hub, the clamp cap member including a tap hole for screwing a disk clamp to clamp the magnetic disk, the tap hole being formed at the center of the clamp cap member, wherein an end surface of said outer ring of said bearing contacts said clamp cap member, whereas a gap is defined between an end surface of said inner ring of said bearing and said clamp cap member.

2. A magnetic disk drive as claimed in claim 1, wherein the clamp cap member is fixedly secured to the center hole of the hub.

3. A magnetic disk drive as claimed in claim 1, wherein the clamp cap member is formed integrally with the hub.

4. A magnetic disk drive as claimed in claim 1, further comprising:

a disk clamp member for urging the disk against a portion of the hub, the disk clamp member including one hole at the center thereof and an auxiliary hole on the circumference thereof, the disk clamp member mounted on the clamp cap member, wherein the hub is provided with a single hole which is aligned with the auxiliary hole formed on the disk clamp member.

\* \* \* \* \*